Figure 3:
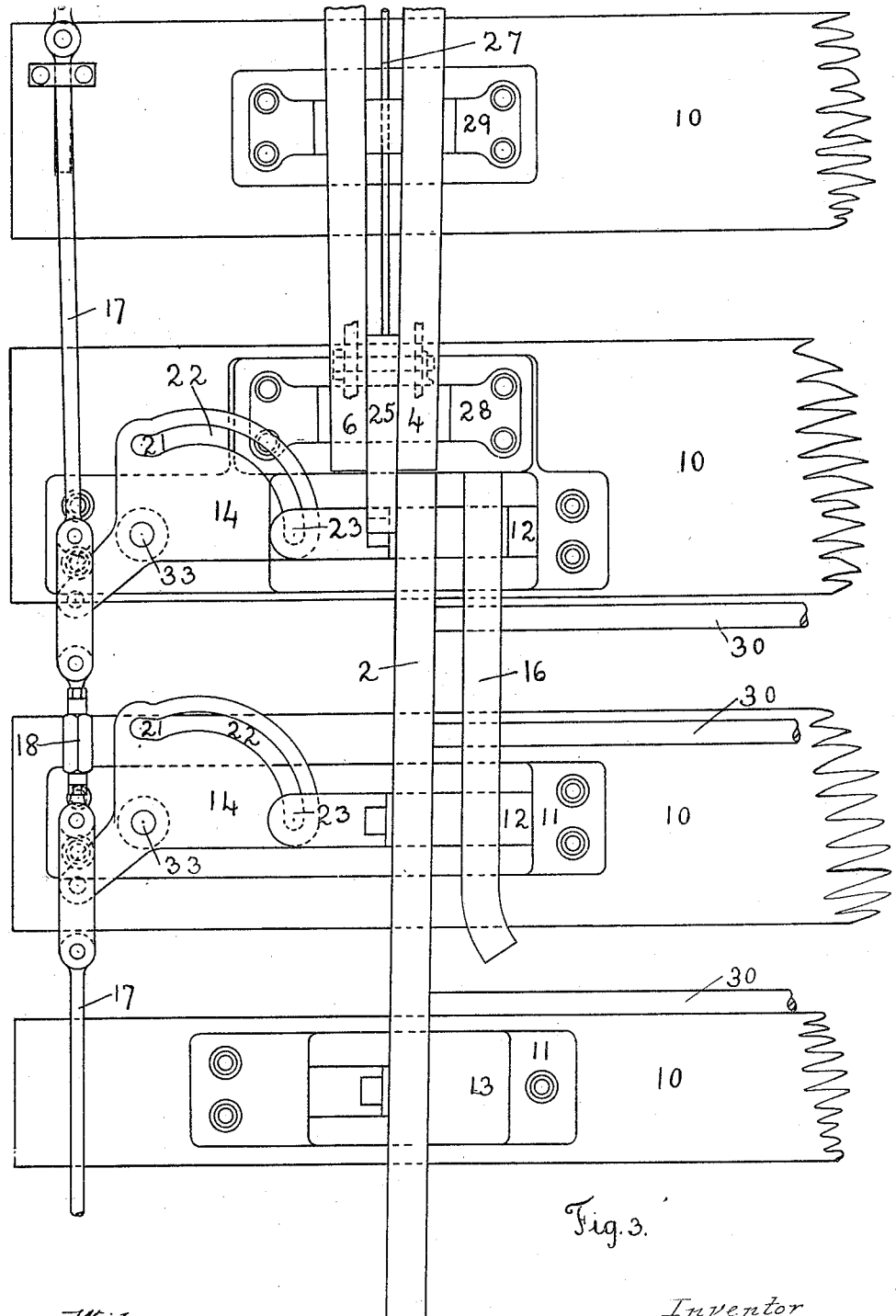

No. 770,614. PATENTED SEPT. 20, 1904.
R. ST. G. ST. GEORGE-MOORE.
RAILWAY SWITCH OR THE LIKE.
APPLICATION FILED MAY 14, 1904.
NO MODEL. 4 SHEETS—SHEET 1.
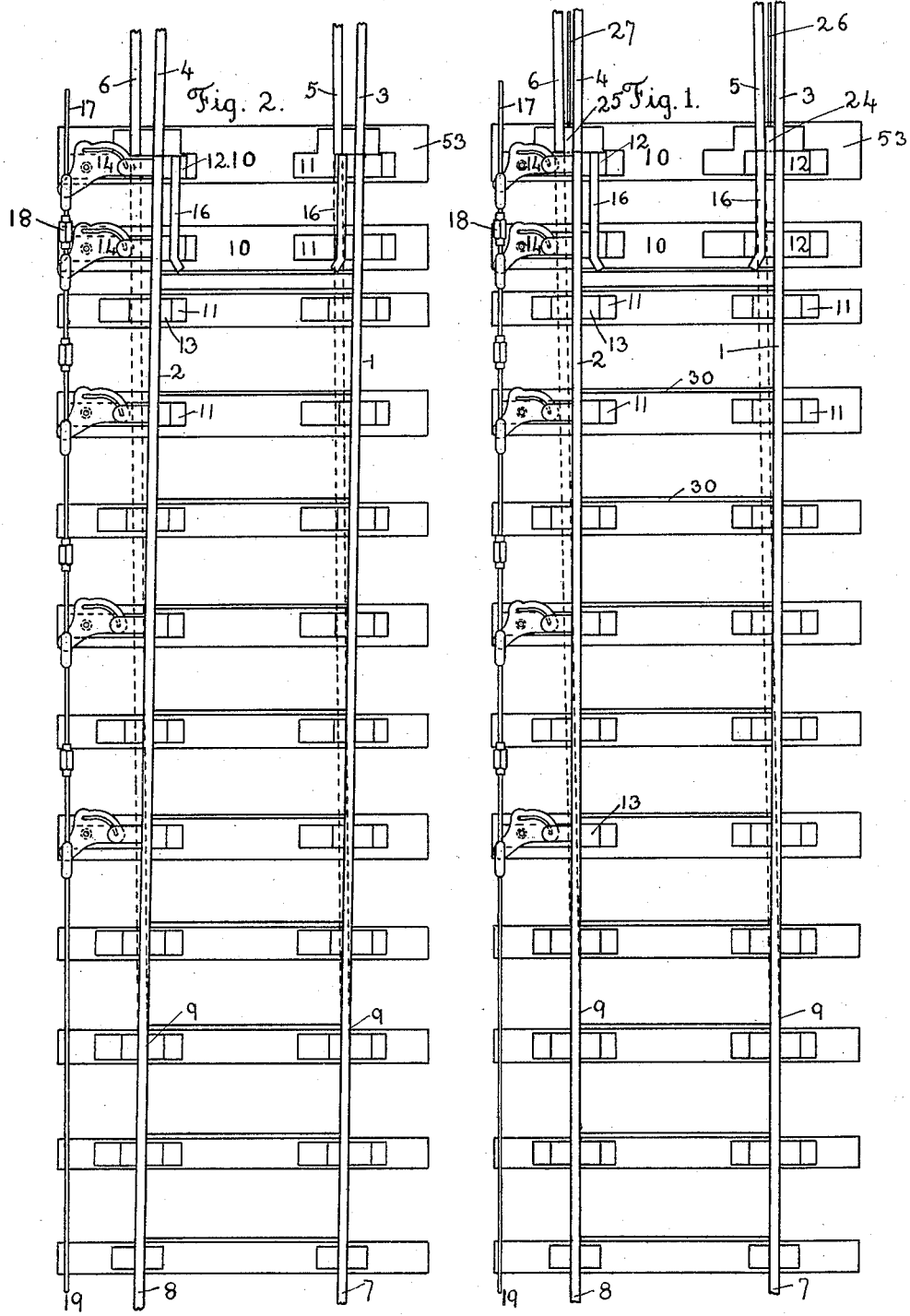

No. 770,614. PATENTED SEPT. 20, 1904.
R. ST. G. ST. GEORGE-MOORE.
RAILWAY SWITCH OR THE LIKE.
APPLICATION FILED MAY 14, 1904.
NO MODEL. 4 SHEETS—SHEET 2.

Witnesses
George G. Schoenlank
Thomas Kirkpatrick

Inventor
Richard St. George St. George-Moore
by H van Oldenneel
Attorney

No. 770,614. PATENTED SEPT. 20, 1904.
R. ST. G. ST. GEORGE-MOORE.
RAILWAY SWITCH OR THE LIKE.
APPLICATION FILED MAY 14, 1904.
NO MODEL. 4 SHEETS—SHEET 3.
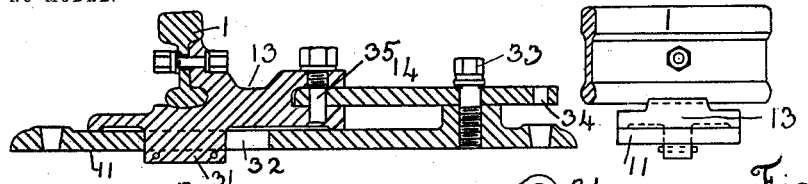
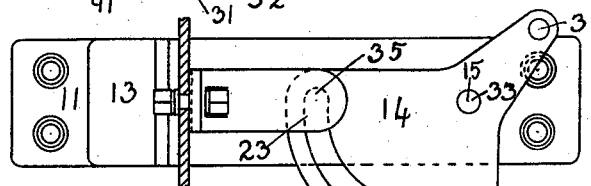
Fig. 4.
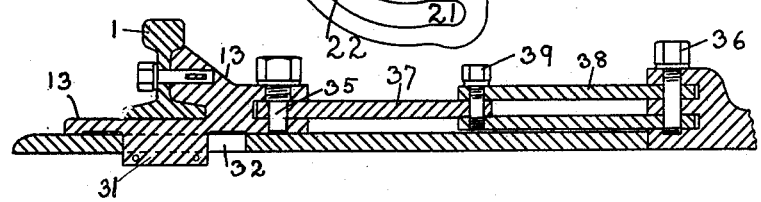 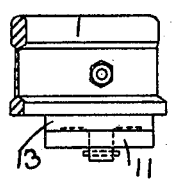
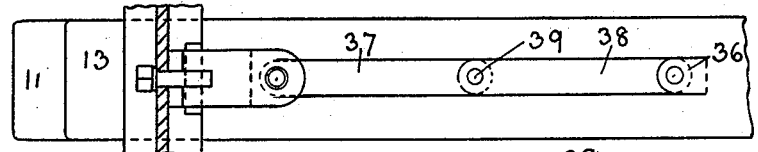
Fig. 5.
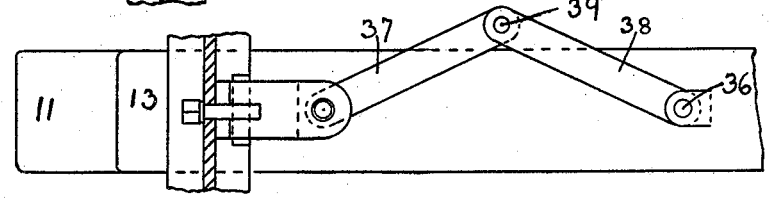
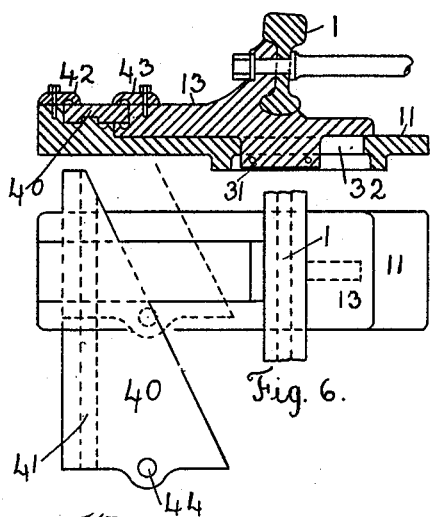
Fig. 6.
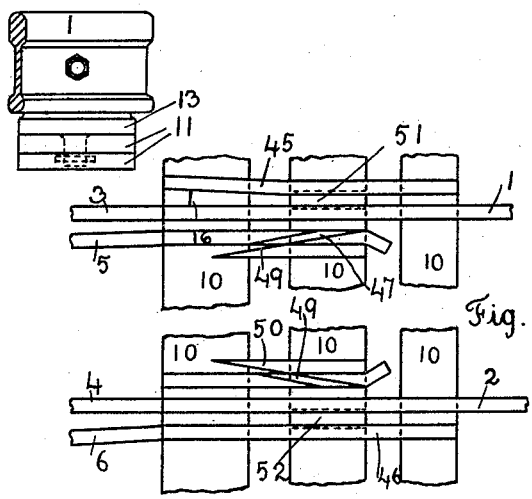
Fig. 7.
Witnesses
George G. Schoenlank
Thomas Kilpatrick
Inventor
Richard St. George St. George-Moore
by H. Van Wensum
Attorney No. 770,614. PATENTED SEPT. 20, 1904.
R. ST. G. ST. GEORGE-MOORE.
RAILWAY SWITCH OR THE LIKE.
APPLICATION FILED MAY 14, 1904.
NO MODEL. 4 SHEETS—SHEET 4.
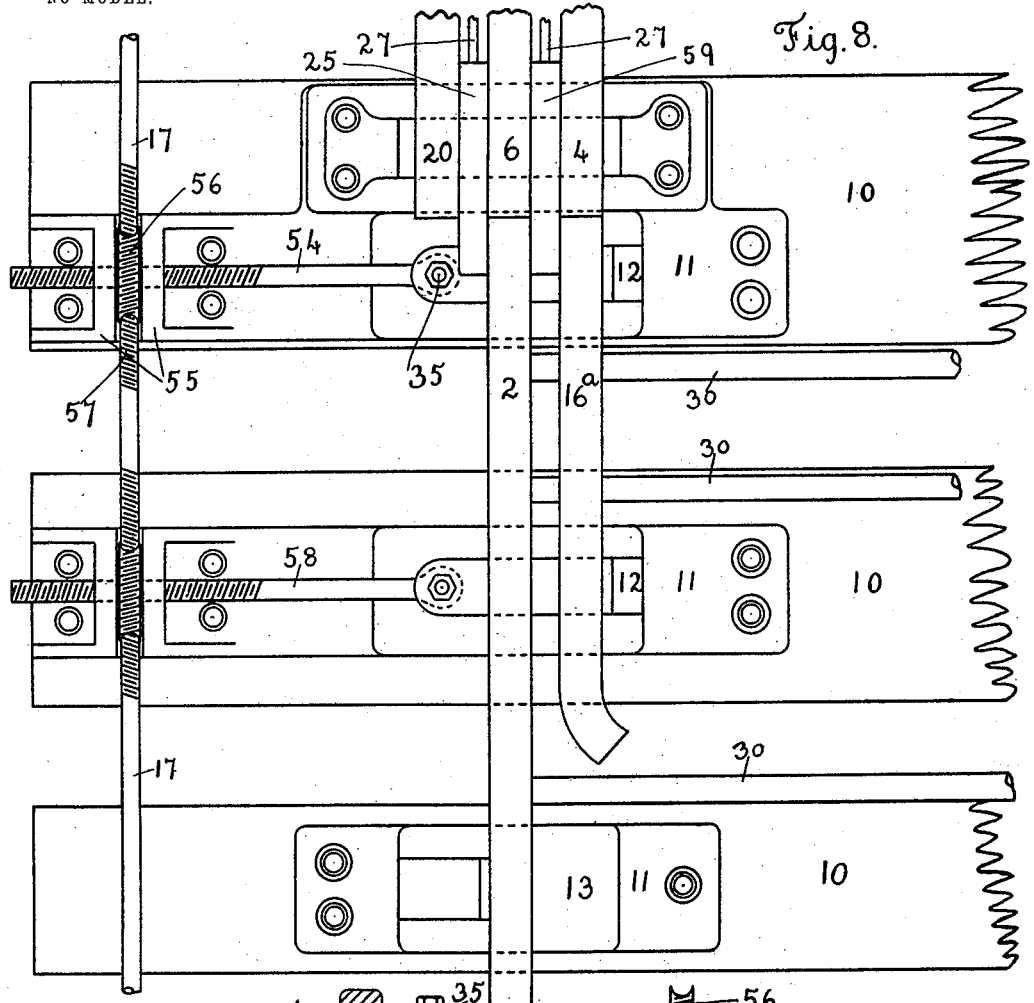
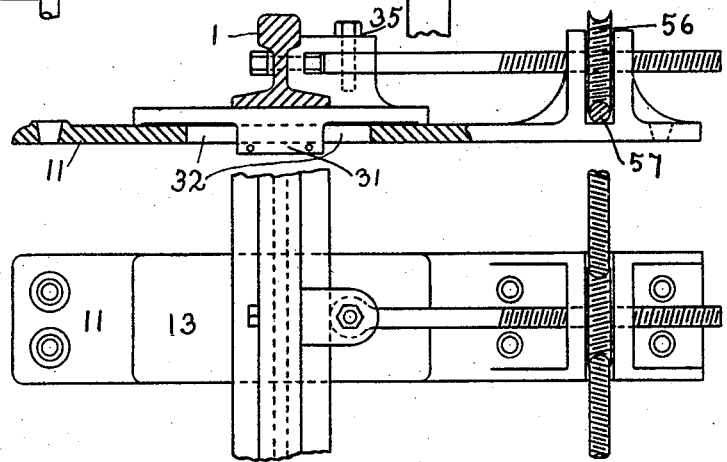
Witnesses
George G. Schoenlank
Thomas Kirkpatrick
Inventor
Richard St. George St. George-Moore
by H. van Oesternzel
Attorney No. 770,614. Patented September 20, 1904.

UNITED STATES PATENT OFFICE.

RICHARD ST. GEORGE ST. GEORGE-MOORE, OF WESTMINSTER, LONDON, ENGLAND.

RAILWAY-SWITCH OR THE LIKE.

SPECIFICATION forming part of Letters Patent No. 770,614, dated September 20, 1904.

Application filed May 14, 1904. Serial No. 207,967. (No model.)

*To all whom it may concern:*

Be it known that I, RICHARD ST. GEORGE ST. GEORGE-MOORE, a subject of the King of Great Britain and Ireland, residing in the city of Westminster, in the county of London, England, have invented a new and useful Improvement in Railway-Switches or the Like, of which the following is a specification.

My invention relates to railway-switches and the like, and has for its object the provision of means whereby a vehicle or train of vehicles can be transferred from one road to any one of two or more roads, or vice versa, in such a way as to reduce the risks of derailment and to permit of the travel of such vehicles over or through such junctions at a greater speed and with greater safety than has been possible in the past, and thus avoid the disadvantages which obtain with tongue-switches at present so largely used.

My invention consists in the arrangement of means by which the rails of a single road may be bent and moved either in one direction or the other in order to form an easy and regular curve or series of curves, so as to directly abut against or to coincide with the rails of either another straight or of two or more diverging roads arranged in connection therewith, and, further, in the means by which such bent and movable portion of the track may be locked in place.

I am aware that in the past it has been common to move upon an axis rails through a certain arc of movement, so that the said rails can abut against or coincide with the rails of one or more roads, an arrangement which is largely used by the contractors in temporary or contractors' railways; also, of arrangements whereby the rails are mounted on a movable platform so as to be placed opposite to one or more roads; but in these cases no means are provided to cause the movable rails to adopt any specific curve.

To carry this invention into effect, I provide sleepers or other supports, and upon the said supports I mount the chairs or other rail-supporting device in such a way as to slide laterally upon the said sleepers or upon plates on the sleeper or within themselves, the said supports or chairs carrying a pair of rails as a flexible switch free at one end and connected by fish-plates at the other to the fixed rails of a track. The pairs of chairs or the rails forming such flexible switch are tied together, so as to maintain the gage of the road. Stops are provided in the chairs or on the sleepers or other support against which the chair can abut and by which the displacement of and consequent curve formed by the rails is determined. I also provide means at the side of the road in the form of cams, toggle-levers, or other convenient device or devices, whereby the rails forming this flexible portion of the road can be bent at various points in a horizontal or approximately horizontal plane exactly to the desired curve, so that the ends of the rails of this flexible portion of the road can be made to coincide with one of two or more of the junction roads and the body of the switch to form the necessary curves for an easy junction therewith.

I may adapt power-gear in any known manner to the operating mechanism by which the movement of the flexible road can be effected, the control of such power-gear being effected by any convenient known means from the signal-box or other station.

I arrange in connection with each pair of chairs or rail-supports a locking-gear or series of locking-gears, so that when the flexible road has been bent to any given position to coincide with any given road it can be locked in such position by means of the said locking-gear, and the latter, if desired, can be worked, in conjunction with the signal-gear, in a similar manner as now obtains with interlocking arrangements between signals and switches.

The flexible rails can be attached to the fixed portion of the road by means of fish-plates or other suitable devices, by which the junction of the fixed and flexible rails can be made as rigid as possible, or the rails, both fixed and flexible, can be supported on chairs at their extreme ends and abut.

If desirable, I may mount guard-rails upon the chairs or supports carrying the flexible rails.

In order to provide for a proper alinement for the flexible rails of any given road, I may provide treadles of any known form arranged to coact with the wheels and flanges of the train, by which the position of the flexible rails can be definitely set and held in position by the passing train.

Reference will now be had to the accompanying drawings, of which—

Figure 1 is a plan showing the junction between a straight road and a diverging curved road, the alternative position of the flexible rails being shown in full and dotted lines, respectively. Fig. 2 is a plan showing the junction between two curved roads, the alternative position of the flexible rails being shown in full and dotted lines, respectively. Fig. 3 is a plan of an enlarged portion of Fig. 2, showing in detail the actuating-cams and the sliding chairs or supports. Fig. 4 shows in sectional elevation, plan, and end view a sliding chair or support with a fixed bed-plate and cam-actuating device. Fig. 5 shows in sectional elevation, side elevation, and in two plans in diverse positions a sliding chair or support with bed-plate and a toggle actuating device. Fig. 6 shows in sectional elevation, end views, and plan a sliding chair or support with bed-plate and a wedge actuating device. Fig. 7 shows a device to prevent derailment when back-shunting. Fig. 8 is a general plan showing the junction between one and two diverging tracks. Fig. 9 shows in sectional elevation and plan a sliding chair or support with screw actuating device for the switch.

On all figures the numbers 1 and 2 designate the flexible rails, which are of the ordinary pattern or section of rail common to the rest of the road; 3 4 and 5 6, the rails of the diverging roads against which the rails 1 and 2 abut in their various positions, 7 and 8 representing either the continuations of the flexible rails beyond the tangent-points 26 26 or other rails firmly fished on.

10 10 are the sleepers or timbers of usual practice.

11 11 are bed-plates attached to the sleepers or timbers.

12 12 are sliding chairs or supports to receive the flexible rail and guard-rail, and 13 13 are the sliding chairs where there is no guard-rail.

14 14 are the cams or quadrants with a curved slot for adjusting the flexible rail to the required curve and for holding the same in position when set. These cams revolve on pins 33, fixed in the base-plate.

16 16 are short sections of guard-rail.

17 17 represent the rod by which signalman actuates the cams.

18 18 are adjusting-screw boxes.

19 is the rod by which the ordinary facing-point locking-bar can be connected with the cams to hold same in position by the weight of the train; 30 30 30 30, the tie-rods holding the road to gage.

21 22 23 represent the curved slot of various curvatures in the cam or quadrant which actuates the flexible rail.

24 25 are bolts or locks placed between the fixed rails 3 and 5, 4 and 6 and actuated by the rods 26 and 27 from the signal-cabin. When 1 is in alinement with 3 and 2 with 4, then lock 24 is shot forward between the flexible rail 1 and guard-rail 16 and the lock 25 is on the outside of 2. When 2 is in alinement with 6, then 25 is between guard-rail 16$^a$ and flexible rail 2 and 24 outside 1.

28 is an ordinary double chair of the pattern common to the rest of the road, with the center portion cut down to allow of the introduction of the lock 24. 27 passes through a hole in the center of the double chair 29 and on to a convenient position to connect with signal-cabin, the double sliding chairs 12 12 also having space left above the center portions to provide for the admission of locks 24 and 25. Where this lock is not adopted, the ordinary facing-point lock can be attached to the tie-rod 30.

In Fig. 4, 1 is the flexible rail; 13, the sliding portion of the chair or support; 11 11 11, the portion of the chair or bed-plate fixed to the sleepers or timbers; 32, the slot in the bed-plate, and 31 the tongue or projecting portion of the sliding portion of the chair which enters the slot 32. 14 is the cam or quadrant; 33, the pin fixed in 11, on which the quadrant works; 34, bolt-hole for connecting quadrant back lever to rod 17. 21 22 23 represent the compound curved slot which engages on pin 35 and moves the sliding portion of the chair or rail-support. The difference between the length of 21 and 23 being the same as the difference between the length of 32 and 31, these differences must equal the amount of movement required on the flexible rail at the various points on the curve where an actuating device is required. The tongue 31 is prevented from rising out of the slot 32 by pin-bolts or collar or some suitable device. The slot 21 22 23 in the cam 14 is composed of radii adapted to give the required movement to the switch and so as to hold the flexible rail in alinement with 3 or 5 against any lateral force which may be applied to the flexible rail by the passage of the train. The radii 21 and 23 are struck from the center 15 and are in length sufficient to allow of the pin 35 remaining at rest on these portions of the curve when the cam is in either position. The radius 22 varies according to the throw of the cam required and may be of any desired curvature; but conveniently it may be struck either from a point on the line passing through the center of the pin 33 and the termination of 23 or on a line passing between the center of the pin 33 and the center of the position in which the pin 35 would lie when at the 23 end of the slot 21 22 23 or at any intermediate position.

In Fig. 5, 1 13 35 11 32 31 indicate the parts above described. 36 is a pin fixed to the bedplate 11. 37 and 38 are toggle-rods, and 39 is a central pin. When the toggle is straight, 1 would be in alinement with 3, when bent in alinement with 5. In order to obtain the required curve, the throw or movement of the toggles has to be varied. At the same time the throw or movement of the levers actuating the toggle must remain the same and act in the same line. This is obtained by making 38 of a uniform length throughout. 37 is also of a uniform length; but the hole in 37 through which bolt 39 passes is slotted, so that when 37 and 38 are in a straight line between 36 and 35 the length between 36 and 35 varies to give the required curve. The rod connecting the toggle with the signal-cabin is attached to bolt 39. There can be toggles on either or both sides attached to all or several or the sliding chairs or supports and actuated by one or more levers or wheels in the cabin.

In Fig. 6, 1 13 11 32 31 indicate the parts described above. 40 is a wedge engaging against a shoulder on the fixed bed-plate 11 and against a shoulder on the sliding chair 13. 41 is a projection on the fixed bed-plate 11, which enters a groove in the wedge 40 to cause it to move in a straight line. 42 and 43 are caps to hold the wedge 40 in position. The rod connecting with the signal-cabin is attached by bolt 44. There can be wedges on either or both sides attached to all or several of the sliding chairs or supports.

In Fig. 7, 3 5 1 10 indicate the parts described above. 45 and 46 are two ramps or inclined rails carried on the sliding chair and moving with the flexible rail so placed that when 1 is in alinement with 5 45 is in alinement with 3 and when 2 is in alinement with 4 46 is in alinement with 6. 47 and 48 are grooves cut at any convenient angle or curve through the guard-rails 16. 49 and 50 are projections attached to the guard-rail 16, prolonging the groove. 51 and 52 are fillingpieces, the tops of which are level with the top of the flexible rail 1. The action is as follows: Should a train be traveling in the direction from 3 and 4 when the flexible rails are set in alinement with 5 and 6, then the wheels traveling along 3 pass on to 45 and those along 4 on 16. The flange of the wheel on 16 engages the projection 50 and is diverted toward 2. The flange of the wheel on 45 travels up the incline of 45 until the flange is on 51 and passes over the top of flexible rail 1. Provision for the expansion and contraction of the rails is made by firmly bolting the abutting ends of 1 and 2, 3 and 4, 5 and 6 to the fixed and movable chairs on sleeper, (marked 53, Figs. 1 and 2,) the bolt-holes in all the attachments where bolts are used being gradually elongated to allow of the rail expanding away from the abutting ends. Where keys are used, the end bolts would be put in just the same and the rail allowed to expand as at present, but in one direction only. At the joint on each side of the switch provision for the expansion would be made.

In Fig. 8, 1 $16^a$ 12 11 30 17 4 6 27 35 indicate the parts above described. 54 is a screw fixed to the sliding chair 12 at 35. 55 55 are brackets fixed to base-plate 11. 56 is a nut in the form of a wheel with teeth cut on the outer periphery, in which the worm 57, attached to the rod 17, engages. 58 is a similar screw to 54, but with a thread of different pitch. When 2 is in alinement with 6, both the locks 25 and 59 are forward. When 2 is to be brought into alinement with either 4 or 6, lock 25 or 59 is withdrawn, rod 17 rotated in the direction required to move (by means of the worm 57 wheel 22 and screw 54) the sliding chair 12 the required amount against the stops above described in the base-plate 11. Lock 25 or 59 is then shot forward to hold same in position. The desired curve is obtained by varying the pitch of the screws 54 and 58 and as many more of these as may be desired or necessary. To bring 2 again in alinement with 6, the operation is reversed, lock 25 or 59 acting as the stop, as the case may be.

Fig. 9 shows the relative positions of wheel 56 and worm 57, also the stop at the end of the throw in either direction.

What I claim as my invention, and desire to secure by Letters Patent, is—

1. The combination with a pair of flexible parallel switch-rails, attached respectively at one end to the fixed rails of a track, adapted to slide radially in a horizontal plane upon a supporting-bed between the rails of other diverging tracks, of means having definite travel for producing horizontal pressures of required amount at various parts of the flexible switch-rails, adapted to bend the said flexible switch-rails into an accurate and desired curve.

2. In combination, a pair of flexible parallel switch-rails, attached respectively at one end to the fixed rails of a track, means for the support of the said parallel rails so that they may slide radially in a horizontal plane between the rails of other diverging tracks; means for applying horizontal pressure at various parts of the flexible switch-rails adapted to bend them into an accurate and desired curve, and means for locking the free ends of the switch-rails in abutting position to the fixed rails of one or other of the diverging tracks.

3. In combination a pair of flexible parallel switch-rails attached respectively at one end to the fixed rails of a track; a bed thereunder of sleepers; fixed sole-plates upon the said sleepers; rail-supports or chairs adapted to slide with predetermined travel upon the said sole-plates, and means operated by the signalman for producing the definite required sliding travel of the said chairs upon the said sole-plate.

4. In combination, a pair of flexible parallel switch-rails attached respectively at one end to the fixed rails of a track; a bed thereunder of sleepers; fixed sole-plates on the said sleepers; a slot in the said sole-plates; a fixed pivot or abutment for pressure mechanism on said sole-plate; a rail-support or chair adapted to slide on said sole-plate; a depending lug or rib on said chair engaging in said slot of the sole-plate; and means pivoting about the fixed pivot on the said sole-plate operated by the signalman for producing the definite required sliding travel of the said chairs upon the said sole-plates.

5. In combination in switch-operating mechanism, a sole-plate with fixed pivot thereon; a rail-support or chair adapted to slide thereon; a cam-plate rotatable on the fixed pivot of the sole-plate; a slot in said cam-plate of diverse radius, adapted to give to sliding chair a required movement on said sole-plate, with positions of stable rest at each extremity of the slot; and connections from cam-plate adapted to enable a signalman at a distance to operate the same.

6. In combination, a pair of flexible parallel switch-rails attached respectively at one end to the fixed rails of a track; means having definite travel applied at various parts of the flexible switch, adapted to bend the said switch into accurate abutment and alinement with two or more diverging tracks; and a bar sliding parallel to the fixed rails adapted to fish and lock the butt-joint between the free ends of the flexible switch-rails and the fixed rail with which it is in alinement.

7. In combination, a pair of flexible parallel switch-rails attached at one end respectively to the fixed rails of a track; multiple pairs of fixed rails forming multiple diverging tracks; adapted to aline and abut with the free ends of the flexible switch as it is bent in various directions; means having definite and adjustable travel transversely to the length of the switch applied at various parts of the flexible switch; and locking-bars between each of the fixed rails of the diverging tracks, adapted to fish and lock the butt-joint, the free ends of the flexible switch and the fixed rail with which it is in alinement.

8. In combination, a pair of flexible parallel switch-rails attached at one end respectively to the fixed rails of a track; multiple pairs of fixed rails forming multiple diverging tracks adapted to aline and abut with the free ends of the flexible switch as it is bent in various directions; transverse screwed bars applied at various parts of the flexible switch; a nut thereon between fixed plate-cheeks and having a worm-gear around the periphery of the said nut; and a longitudinal screwed bar engaging into said worm-nuts and adapted to be operated from a distance by a signalman.

In witness whereof I have hereunto set my hand in presence of two witnesses.

RICHARD ST. GEORGE ST. GEORGE-MOORE.

Witnesses:
CHARLES CARTER,
A. D. JAMESON.